United States Patent Office 3,784,675
Patented Jan. 8, 1974

3,784,675
PROCESS FOR REDUCING THE CONTENT OF NITROGEN OXIDES IN THE EXHAUST GASES FROM INTERNAL COMBUSTION ENGINES
Tadeusz P. Kobylinski, Cheswick, and Brian W. Taylor, Richland Township, Allegheny County, Pa., assignors to Gulf Research & Development Company, Pittsburgh, Pa.
No Drawing. Continuation-in-part of application Ser. No. 168,430, Aug. 2, 1971. This application Dec. 13, 1971, Ser. No. 207,545
Int. Cl. B01d 53/34
U.S. Cl. 423—213.5      19 Claims

ABSTRACT OF THE DISCLOSURE

A method is proposed for the reduction of nitrogen oxides in exhaust gases from internal combustion engines to selectively form nitrogen as substantially the only nitrogen-containing product. The method comprises contacting an exhaust gas from an internal combustion engine at an elevated temperature in a reducing atmosphere with about 0.003 to about 0.5 troy ounce of ruthenium per 1000 cubic feet of exhaust gas per hour.

---

This application is a continuation-in-part application of our application Ser. No. 168,430, filed Aug. 2, 1971 for Ruthenium Nitric Oxide Reduction Catalyst.

This invention relates to the selective removal of nitrogen oxides in the exhaust gases from internal combustion engines. In particular, this invention relates to the selective removal of nitrogen oxides in the exhaust gases from internal combustion engines, without the formation of significant amounts of ammonia, using ruthenium as the catalyst therefor.

Considerable research effort has been expended over the past several years to discover means for the removal of nitrogen oxides in the exhaust gases from internal combustion engines. Nitrogen oxides constitute an undesirable air pollutant, but the removal of these nitrogen oxides, i.e., NO and $NO_2$, has proven to be a much more difficult problem than first anticipated. These problems and some of the solutions tried are described in the Paper "$NO_x$ Reduction Catalysts for Vehicle Emission Control" by G. H. Meguerian and C. R. Lange, published by the Society of Automotive Engineers, Inc. and presented as a part of the Automotive Engineering Congress Meeting in Detroit, Mich. on Jan. 11–15, 1971. The problem is complicated by the fact, that while several catalytic materials are available to convert nitrogen oxides (which are present in low concentrations in the exhaust gases from internal combustion engines) very rapidly to acceptible inert materials, such as nitrogen, most of these catalysts are active only when pure reducing agents, such as carbon monoxide, are used in an anhydrous environment. Examples of these types of materials are the transition metal oxides, which are easily poisoned by trace amounts of water. It is obvious these catalytic materials are unacceptable for use in an automobile exhaust converter, since the automobile exhaust gases can contain up to 16 per cent water.

Noble metals, such as platinum and palladium, retain their activity for the reduction of nitrogen oxides in the presence of water; however, hydrogen as a reducing agent using platinum or palladium as the reduction catalyst proved totally unacceptable, since hydrogen was found to react with the nitrogen oxides to produce substantial amounts of unwanted ammonia. The use of carbon monoxide as a reducing agent was also found undesirable, since it reacted with water over the platinum or palladium catalyst by the well-known water gas shift reaction to give hydrogen and $CO_2$. The hydrogen would then, in turn, react preferentially with the nitrogen oxides to give ammonia. Ammonia is not only a pollutant per se, but, additionally, the ammonia, if present, would be re-oxidized back to the undesirable nitrogen oxides in a second-stage reaction chamber, which would be normally employed to oxidize any unburned hydrocarbons or carbon monoxide in the exhaust gases to form $CO_2$ and water. As a consequence, the desired amount of nitrogen oxide removal could not be achieved. It was, of course, not possible to add the oxidizing gas to the first stage, since the platinum and palladium catalysts do not function to reduce NO in the presence of a predominating oxidizing atmosphere.

We have found that substantially all of the nitrogen oxides in exhaust gases from internal combustion engines can be selectively reduced to form nitrogen as substantially the only nitrogen-containing compound, without formation of significant amounts of ammonia, by a process which comprises passing said exhaust gas at elevated temperatures in a reducing atmosphere into contact with a catalyst bed containing from about 0.003 to about 0.5 troy ounce of ruthenium per 1000 cubic feet of exhaust gas per hour. By "substantially all of the nitrogen oxides" we mean that at least about 75 mol percent of the nitrogen oxides are converted herein, preferably at least about 85 mol percent are converted, but most preferably at least about 90 mol percent are converted. By "troy ounce" of ruthenium we mean 31.1 grams of ruthenium.

The gas mixtures of interest for treatment in accordance with the process of this invention are those gas mixtures produced by the combustion of a hydrocarbon fuel using air, such as the exhaust gases from an internal combustion engine utilizing a hydrocarbon-type fuel. By "an internal combustion engine" we mean to include an engine having a combustion chamber wherein a hydrocarbon fuel is burned with molecular oxygen and the products of combustion are used to drive moving parts, such as a piston, rotors, etc. These hydrocarbon fuel exhaust gases contain small concentrations of NO and $NO_2$ where usually the mol ratio of NO to $NO_2$ exceeds 1:1.

An automobile exhaust gas that can be treated in accordance with the process defined and claimed herein would have a composition whose major components would be as shown in Table I below:

TABLE I

| Components | Broad range, mol percent | Usual range, mol percent |
|---|---|---|
| (1) $NO_x$, where $x$ is 1 or 2, p.p.m.[2] | 50–5,000 | 100–3,500 |
| (2) Free molecular oxygen | 0–5 | 0.5–2 |
| (3) Free molecular hydrogen | 0.1–4 | 0.2–1 |
| (4) CO | 0.2–8 | 0.4–2 |
| (5) Hydrocarbons,[1] p.p.m.[2] | 0–4,000 | 50–1,000 |
| (6) $H_2O$ | 5–16 | 10–13 |
| (7) $CO_2$ | 5–16 | 10–13 |
| (8) Lead (as metal), p.p.m.[2] | 0–12 | 0–4 |
| (9) Nitrogen | 53–89 | 68–78 |

[1] Calculated as carbon.
[2] By volume.

The catalyst for use in the process of this invention is ruthenium. The ruthenium can be unsupported and is substantially pure form, but in a preferred embodiment the ruthenium is suitably distended upon a support. The amount of ruthenium, calculated as the metal, on the support can suitably be, for example, from about 0.01 to about 10 weight percent of the support, but is usually and preferably from about 0.05 to about 1.0 weight percent of the support.

The support for the ruthenium catalysts to be used in the process of this invention can be any of the refractory oxide supports well-known in the art, such as those prepared from alumina, silica, magnesia, thoria, titania, zirconia, silica-aluminas, silica-zirconias, magnesia-aluminas, etc. In addition, the support can be an activated carbon, pumice, etc. Other suitable supports include the naturally-occurring clays, such as diatomaceous earth. In general, the surface area of these supports can be from about 10 m.$^2$ to about 500 m.$^2$ per gram, preferably from about 50 m.$^2$ to about 300 m.$^2$ per gram. Additional desirable supports for use herein are the more-recently developed corrugated ceramic materials made, for example, from alumina, silica and magnesia, lithium, etc. An example of such ceramic material is Therma Comb made by American Lava Corporation, Chattanooga, Tenn., which is more fully described in U.S. Pat. No. 3,444,925. If desired, the ruthenium can be mounted directly onto the surface of the ceramic material, the ceramic material can first be coated with a refractory oxide, such as defined above, prior to the deposition of ruthenium thereon or ruthenium can be combined with the refractory oxide and the resultant combination can then be deposited on the ceramic material. The ceramic materials per se have a low surface area and high heat stability, and the addition of the refractory oxide coating increases the surface area to a more desirable range. In addition, these coated ceramics possess the further advantage of being easily formed in one piece. Very little, if any, pressure drop is experienced by the passage of exhaust gases through such ceramic materials.

Any suitable method well-known to those having ordinary skill in the art can be employed in the preparation of the supported ruthenium catalyst used herein. For example, the ruthenium can be deposited on a support by contacting the support with an aqueous solution of ruthenium chloride at room temperature and room pressure for a suitable period of time, for example, about six hours. The catalyst can then be dried and calcined in the usual manner, for example, dried for six hours at 200° F. and then calcined for 12 hours at a temperature of about 700° to about 1000° F., after which it is ready for use in the process defined herein. Some of the ruthenium on these supports can be present as a chemical compound, for example, as ruthenium oxide, or some can be chemically and/or physically bonded to the surface of the support, for example, with an alumina base a chemical bond may exist between the surface oxide ions and the ruthenium, but, in general, it is believed most of the ruthenium is present in its elemental form.

The reaction conditions which are employed in the selective reduction of a nitrogen oxide using the ruthenium catalyst of this invention are important in order to obtain a product wherein nitrogen is substantially the only nitrogen-containing product. By the statement that nitrogen is substantially the only nitrogen-containing product is meant that little or no ammonia is formed during the reduction despite the fact that the reduction occurs in the presence of hydrogen. In general, by following the procedure defined herein no more than about seven weight percent of the nitrogen oxides in the exhaust gas are converted to ammonia, but in most instances less than about three weight percent are converted to ammonia. It has been found that in order to selectively reduce the nitrogen oxides in the presence of hydrogen while producing substantially no ammonia, the conditions in the reaction zone should be a temperature of about 400° to about 1500° F., or even higher, preferably about 800° to about 1400° F. By operating the process as defined herein substantially all of the nitrogen oxides are converted to nitrogen and water and only a small amount thereof is converted to ammonia. It was quite surprising that ruthenium, even at the low temperature conditions of 400° to 800° F., would produce substantially no ammonia in the presence of hydrogen. Contrary to this it was found that platinum and palladium would convert from 60 to 100 percent of the nitrogen oxides to ammonia treating the same gas mixtures under similar reduction conditions. Since ruthenium is also a member of the noble metals, we expected that the ammonia formation characteristics of the ruthenium would be similar to those of platinum and palladium under similar conditions. In fact, U.S. Pat. No. 3,084,023 to Anderson et al. teaches that ruthenium is the catalyst of preference to convert NO to ammonia in the presence of hydrogen. Anderson et al.'s process, however, differs markedly from that of the present invention by the treatment of synthesis gas mixtures wherein the mol ratio of hydrogen to NO is very high, on the order of 8,000 to 20,000 to 1 and wherein the temperature of reaction is relatively low (100° to 250° C.). Surprisingly, it has been found herein that ruthenium is a catalyst of choice for the selective reduction of nitrogen oxides in the presence of hydrogen to form nitrogen under temperature conditions where substantially no ammonia is formed. Moreover, this selective reduction capability of ruthenium is not adversely affected by the simultaneous presence of water and hydrogen. Even though it is known that noble metals, such as ruthenium (U.S. Pat. No. 2,601,221 to Rosenblatt et al.) and platinum (Journal of The Chemical Society of Japan, Pure Chemistry Section, "Decomposition of Ammonia on Platinum," Volume 70, page 439, Shozo Miyazaki), under some conditions have a tendency to decompose ammonia, the process herein is not a case where the ammonia is initially formed by the ruthenium and thereafter decomposed, but rather under the conditions set forth, the ammonia does not form above about 800° F. or forms in very low amounts at temperatures from about 400° to about 800° F.

The reaction pressure is not critical and suitable pressures are from 0 to 150 pounds per square inch gauge, with the preferred pressure being atmospheric or slightly above. It has also been found that the ruthenium is an excellent catalyst at both low and high gas hourly space velocities (GHSV), i.e., at 8,000 to about 200,000, or even higher, volumes of gas per hour per volume of catalyst. In general, we prefer to operate at space velocities of about 10,000 to about 90,000. Here, as elsewhere in this specification, volumes are defined as being at standard conditions, that is, 760 mm. Hg and 0° C.

One of the critical requirements herein to convert substantially all of the nitrogen oxides to nitrogen, rather than to ammonia, is the absolute amount of ruthenium present in the reaction zone. We have found that it is critical to have ruthenium in the reaction zone in an effective catalytic amount, that is, from about 0.003 to about 0.5 troy ounce of ruthenium per 1000 cubic feet of exhaust gas being treated per hour, preferably from about 0.008 to about 0.3 troy ounce of ruthenium per 1000 cubic feet of exhaust gas per hour, but most preferably from about 0.01 to about 0.2 troy ounce of ruthenium per 1000 cubic feet of exhaust gas per hour. In general, during idling an internal combustion engine, particularly of the automotive type, can produce as low as about 600 cubic feet per hour of exhaust gas and at extremely high speeds, for example, at speeds in excess of about 60 miles per hour, can produce as high as about 12,000 cubic feet per hour of exhaust gas, but in general from about 1500 to about 8000 cubic feet per hour of exhaust gas will be produced at speeds below about 60 miles per hour. An additional critical requirement herein is to maintain an effective reducing atmosphere in the reaction zone. We have found that the concentration of molecular oxygen in the gaseous mixture being treated has no adverse effect on the ruthenium catalyst, as used herein, provided a reducing atmosphere is maintained during the reaction. By "reducing atmosphere" we mean an atmosphere wherein the stoichiometric ratio of molecular oxygen to the reducing agents in the reaction zone is less than 1:1, preferably about 0.9:1 or less. By "stoichiometric ratio of molecular oxygen to the reducing agents" we mean the amount of oxygen stoichiometrically required to convert the reducing agent or agents to their higher oxidation states. By "reducing agent" we mean to include substances which can be oxidized in the reaction zone by molecular oxygen, for example, substances such as hydrogen and carbon monoxide which can be converted to water and carbon dioxide, respectively.

The ruthenium catalyst is, of course, primarily meant to be utilized as part of a reactor system to be attached at any suitable location in the exhaust system of an automobile. The temperature of the reactor system can suitably be regulated to the desired temperature by the position of the reactor with respect to the gases exiting from the internal combustion engine. The further from the engine the reactor is placed, the cooler will be the gases entering the reactor. It may also be desirable to utilize some of the exhaust gases initially to preheat the reactor catalyst chamber before the gases enter into the catalyst chamber. A suitable means of doing this could be that disclosed in the Meguerian-Lange paper mentioned earlier.

It is also important with automotive exhaust gases to not only remove nitrogen oxides but also to remove unburned hydrocarbons and carbon monoxide. As will be shown hereinafter, no appreciable conversion of hydrocarbons or carbon monoxide occurs as a result of the water gas shift reaction under the reducing atmosphere employed herein during treatment of the exhaust gases with ruthenium in accordance with the process defined and claimed herein. The removal of the unburned hydrocarbon and carbon monoxide can easily be achieved by an oxidation reaction using known catalysts under known oxidizing conditions. This oxidation must occur, however, in the substantial absence of ammonia, since ammonia will quickly reoxidize to form undesirable nitrogen oxides. By the use of the ruthenium catalyst, utilizing the conditions as set forth herein, to obtain a product having substantially no ammonia, the product gases can then be oxidized in a second-stage converter utilizing oxidation catalysts, which are well-known in the art, under oxidation conditions to oxidize any unburned hydrocarbons and carbon monoxide to non-polluting gases such as carbon dioxide and water. Usually combustion air is pressurized into the $NO_x$-free gases at a flow rate such that the average temperature of the catalyst bed is maintained at a level from about 800° to about 1700° F., preferably a temperature of 900° to 1100° F. Any of the metals of Group VIII, for example, platinum, palladium, ruthenium, etc. can successfully be employed in the oxidation of unburned hydrocarbons and CO to produce $CO_2$ and water in the presence of a combustion gas such as air. In addition, copper, vanadium or chromium-containing catalysts can also be used. The metals are usually distended on a support which can be the same as the supports described above for use with the ruthenium catalyst. Other typical oxidation catalysts, conditions and operational procedure can be the same as described in U.S. Pat. No. 3,503,715 to Haensel and the teachings of this patent are incorporated herein by reference. Still another procedure for the oxidation of unburned hydrocarbons and CO with molecular oxygen in the presence of oxidation catalysts, including ruthenium, is claimed in U.S. Pat. 3,257,163 to Stiles.

The invention will be further described with reference to the following experimental work.

Experiments were conducted with two different ruthenium catalysts, one containing 0.1 percent by weight of ruthenium supported on alumina spheres, and the other containing one percent by weight of ruthenium supported on alumina spheres for the reduction of nitrogen oxides in the presence of $H_2$. The one-sixteenth diameter alumina spheres have the following characteristics: 190 m.²/gram surface area; 0.82 cc./gram pore volume, and an average pore diameter of 185 A. The ruthenium was added to the alumina spheres by contacting them with an aqueous solution of ruthenium chloride at atmospheric temperature and atmospheric pressure. The catalysts were then dried at a temperature of 250° F. for six hours and the catalysts then calcined at 900° F. for six hours.

A first series of runs was made using the one percent ruthenium catalyst having a density of 0.5 gram/cc. to determine the effect of various hydrogen-containing or hydrogen-producing reducing gases on the formation of nitrogen or ammonia. The feed consisted of 1.5 mol percent NO, and either (1) three mol percent hydrogen, (2) three mol percent hydrogen and three mol percent carbon monoxide, or (3) three mol percent carbon monoxide and three mol percent water and the remainder argon. This feed was used merely for determination of catalyst activity and no attempt was made to make this synthetic mixture similar to an exhaust gas mixture from an internal combustion engine. The runs were made at temperatures varying from 500° to 850° F. and a gas flow rate of 20,000 gas hourly space velocity (GHSV). At this space velocity 0.22 troy ounce of ruthenium was present per 1000 cubic feet of gas being treated per hour. The amount of ruthenium in the examples herein was determined in accordance with the following equation:

$$\frac{\text{Weight Percent Ruthenium on Support} \times 1000}{\text{GHSV} \times \text{Factor}}$$

wherein the factor is determined in accordance with the following equation:

$$\frac{31.1}{\text{Density of Catalyst} \times 10 \times 28.31}$$

the number 31.1 being the number of grams in one troy ounce, 28.31 being the number of liters in one cubic foot of gas, the GHSV is expressed in liters of gas per liter of catalyst per hour, and the density is defined in grams/cc.³. The products were analyzed to determine the percent selectivity of the nitrogen oxide to ammonia conversion. In all runs, the NO reduction was 100 percent. The results are summarized in Table II below:

TABLE II

Nitrogen oxide reduction using one weight percent Ru on $Al_2O_3$ and a total gas rate of 20,000 GHSV

| Ex. No. | Feed composition, mol percent | | | | Reaction temperature, ° F. | Weight percent conversion of NO to $NH_3$ [1] |
|---|---|---|---|---|---|---|
| | NO | $H_2$ | CO | $H_2O$ | | |
| 1 | 1.5 | 3.0 | | | 510 | 2.1 |
| 2 | 1.5 | 3.0 | | | 625 | 2.7 |
| 3 | 1.5 | 3.0 | | | 750 | 1.1 |
| 4 | 1.5 | 3.0 | | | 800 | 0 |
| 5 | 1.5 | 3.0 | 3.0 | | 500 | 4.3 |
| 6 | 1.5 | 3.0 | 3.0 | | 625 | 4.8 |
| 7 | 1.5 | 3.0 | 3.0 | | 695 | 4.1 |
| 8 | 1.5 | 3.0 | 3.0 | | 800 | 0.2 |
| 9 | 1.5 | | 3.0 | 3.0 | 500 | 0.9 |
| 10 | 1.5 | | 3.0 | 3.0 | 600 | 0.9 |
| 11 | 1.5 | | 3.0 | 3.0 | 750 | 0 |
| 12 | 1.5 | | 3.0 | 3.0 | 800 | 0 |

[1] Remainder converted to nitrogen.

Referring to Table II, it can be seen that in no example is the conversion of NO to ammonia greater than five weight percent. About five percent conversion of NO to ammonia occurs when the reducing gas is a mixture of equal amounts of hydrogen and carbon monoxide. When hydrogen is used as the sole reduction gas, even less ammonia is formed and, quite surprisingly, when carbon monoxide and water are used as the reduction gas, very small amounts of ammonia are found in the product even at 400° to 800° F.

Another set of experiments was performed to determine the percent nitrogen oxide reduction utilizing the one percent weight ruthenium on alumina catalyst at a gas flow rate of 15,000 GHSV. Thus, 0.30 troy ounce of ruthenium was present per 1000 cubic feet of gas being treated per hour. Varying temperatures were employed and the charge stock consisted of 1.5 mol percent NO and three mol percent carbon monoxide, or 1.5 mol percent NO and three mol percent hydrogen, the remainder being argon. The results of these experiments are shown in Table III below:

TABLE III

Reduction of NO in the presence of $H_2$ or CO at a total gas flow rate of 15,000 GHSV using one percent Ru on Alumina catalyst

| Ex. No. | Feed composition,[1] mol percent | | | Reaction temperature, °F. | Mol percent reduction of NO |
|---|---|---|---|---|---|
| | NO | $H_2$ | CO | | |
| 13 | 1.5 | 3.0 | | 225 | 0 |
| 14 | 1.5 | | 3.0 | 225 | 0 |
| 15 | 1.5 | 3.0 | | 398 | 11.5 |
| 16 | 1.5 | | 3.0 | 360 | 7 |
| 17 | 1.5 | | 3.0 | 405 | 76 |
| 18 | 1.5 | 3.0 | | 405 | 82 |
| 19 | 1.5 | | 3.0 | 415 | 100 |
| 20 | 1.5 | 3.0 | | 421 | 100 |

[1] Remainder is argon.

Referring to Table III, it can be seen that the results are substantially the same when either hydrogen or carbon monoxide is used as the reducing gas as far as the percent nitrogen oxide reduction is concerned. Substantially complete nitrogen oxide reduction occurs at a temperature as low as about 400° F. However, as noted from the experiments in Table II above, it is necessary to go to a temperature of about 800° F. in order to completely eliminate the formation of ammonia as a product. Thus, while the nitrogen oxides might be completely reduced at temperatures as low as 400° F., only small amounts of nitrogen oxides are converted to ammonia. If this is undesirable, then higher temperatures can be employed to eliminate substantially all of the ammonia in the product.

When the experiments in Table III were repeated using a 0.1 weight percent Ru catalyst, that is, 0.03 troy ounce of ruthenium per 1000 cubic feet per hour of gas being treated, the temperature required to achieve substantially the same results was higher by about 90° F. Thus, substantially the same results are obtained using 0.1 weight percent of one percent Ru except a higher temperature is required using the 0.1 weight percent ruthenium on alumina catalyst. However, since a higher temperature is required to completely eliminate the formation of ammonia in the product, and since ruthenium is an expensive component, it is satisfactory to employ a 0.1 weight percent ruthenium catalyst, despite the fact that higher temperatures are required to achieve similar percent reductions in nitrogen oxide.

The temperature to achieve a 90 percent NO reduction using a one percent Ru on alumina catalyst as described above, and charging a gas mixture containing 1.5 mol percent NO, three mol percent $H_2$ or three mol percent CO; three mol percent water and the remainder argon at flow rates of 10,000; 15,000; 40,000 and 80,000 GHSV (0.45, 0.30, 0.11 and 0.05 troy ounce of ruthenium per 1000 cubic feet per hour of gas being treated, respectively) was 380° F.; 425° F.; 615° F. and 810° F., respectively, showing that an increased flow rate requires an increased temperature to achieve the same degree of NO reduction. In all cases substantially all of the NO was converted to nitrogen. In order to reduce all of the NO, with substantially all being converted to nitrogen, slightly higher temperatures at each of the respective space velocities will be required.

When similar experiments to those set forth in Tables I through III above were run utilizing platinum or palladium as the catalyst on alumina, very large amounts of ammonia were found in the reaction product, i.e., of the NO reduced, from 60 to 100 mol percent was reduced to form $NH_3$ and thus platinum and palladium were found to be unacceptable for use in a process to reduce nitrogen oxide in the presence of hydrogen.

EXAMPLE 21

In the run for this example, 50 cc. of a ruthenium on alumina catalyst containing about 0.8 weight percent ruthenium was mounted in the exhaust pipe of a single cylinder internal combustion engine. A lead-free gasoline was employed as the fuel for the single cyclinder engine, and the flow rate of the exhaust gases through the catalyst bed which was at a temperature of about 680° F. was on the order of 20,000 GHSV. Thus there was used 0.18 troy ounce of ruthenium per 1000 cubic feet per hour of gas being treated. The composition of the inlet gases to the catalyst bed and the outlet gases from the catalyst bed are set forth in Table IV below.

TABLE IV

| Component | Inlet to the Ru catalyst chamber, mol percent | Outlet from the Ru catalyst chamber, mol percent |
|---|---|---|
| $NO_x$, p.p.m.[1] | 1,000–1,200 | 0 |
| Hydrocarbons, p.p.m.[1] as carbon | 1,200 | 1,200 |
| CO | 1.2 | 0.7 |
| $CO_2$ | 12.0 | 12.4 |
| $O_2$ | 0.2 | 0 |
| $H_2O$ | 12.0 | (²) |

[1] By volume.
[2] Not measured.

Nitrogen, of course, formed the remainder of the inlet and outlet gases. Analysis of the outlet gases was made every eight hours and the analyses were substantially constant. The run was continued for 112 hours. Analysis of the exit gases showed a maximum of five weight percent conversion of $NO_x$ to ammonia.

When the run was repeated at 900° F., substantially the same results were obtained. However, the amount of $NO_x$ converted to ammonia decreased to less than two weight percent.

EXAMPLE 22

Example 21 was repeated with a catalyst containing only 0.1 weight percent ruthenium, that is, 0.02 troy ounce of ruthenium per 1000 cubic feet per hour of gas being treated. The fuel contained lead alkyls equivalent to 0.5 gram of lead, calculated as the metal, per gallon. The inlet and outlet gases had substantially the same composition as shown in Table IV above. The run was continued for 32 hours.

EXAMPLE 23

When Example 21 was repeated with a catalyst containing 0.5 weight percent ruthenium, that is, 0.11 troy ounce of ruthenium per 1000 cubic feet per hour of gas and with a fuel containing lead alkyls equivalent to three grams of lead, calculated as the metal, per gallon, the inlet and outlet gases had substantially the same composition as shown in Table IV above and the catalyst retained its initial activity for 300 hours, after which the catalyst activity began to decline somewhat. Repeating the latter operation with gasoline containing lead alkyls equivalent to 0.5 gram of lead, calculated as the metal, per gallon, the inlet and outlet gases again had substantially the same composition as shown in Table IV above, but the catalyst maintained its activity for 1250 hours with no significant reduction in activity.

Unexpectedly, the selective reduction of nitrogen oxides to nitrogen in the presence of the specified amounts of ruthenium is independent of the concentration of nitrogen oxides present in the exhaust gases being treated. For example, whether the exhaust gases contain nitrogen oxides in amounts far exceeding those amounts normally found in the exhaust gases of an internal combustion engine or whether the nitrogen oxides are present in lower amounts, substantially complete conversion of the nitrogen oxides, without the formulation of significant amounts of ammonia, occurs when the gases are treated with ruthenium in accordance with the process defined herein. Experiments to show these results are summarized in Table V below.

TABLE V

Reduction of NO using one weight percent Ru on alumina catalyst at 20,000 GHSV [1]

| Example No. | Feed composition,[2] mol percent | | | | Reaction temperature, °F. | Weight percent conversion of NO to $NH_3$[1] |
|---|---|---|---|---|---|---|
| | NO (p.p.m.) | $H_2$ | CO | $H_2O$ | | |
| 24 | 15,000 | 4.5 | | | 600 | 2.72 |
| 25 | 15,000 | 4.5 | | | 750 | 1.30 |
| 26 | 15,000 | | 4.5 | 4.5 | 700 | 0 |
| 27 | 13,000 | 3.9 | | | 600 | 2.89 |
| 28 | 13,000 | 3.9 | | | 750 | 1.13 |
| 29 | 13,000 | | 3.9 | 3.9 | 700 | 0.11 |
| 30 | 10,000 | 3.0 | | | 600 | 2.89 |
| 31 | 10,000 | 3.0 | | | 750 | 1.91 |
| 32 | 10,000 | | 3.0 | 3.0 | 700 | 0.22 |
| 33 | 2,500 | 0.75 | | | 600 | 3.23 |
| 34 | 2,500 | 0.75 | | | 750 | 1.69 |
| 35 | 2,500 | | 0.75 | 0.75 | 700 | 0.39 |

[1] 0.22 troy ounce of ruthenium per 1,000 cubic feet of gas being treated per hour.
[2] Remainder is argon.
[3] Remainder converted to nitrogen.

EXAMPLE 36

In the run for this example, the gas feed mixture consisted of one mol percent NO; three mol percent CO; from three to 15 mol percent water; and the remainder argon. The feed gas was passed downflow through a total volume of 30 cc. of a corrugated ceramic material, such as defined above, which was coated with alumina and had impregnated thereon about 0.8 weight percent ruthenium. The feed gas was passed at a GHSV of 20,000 (0.18 troy ounce of ruthenium per 1000 cubic feet per hour of gas treated) and the temperature of contact was 850° F. The exit gases showed zero percent NO and zero percent $NH_3$.

EXAMPLE 37

Example 36 was repeated except one mol percent propane was added to the feed gas mixture and the reactor system consisted of two separate 30 cc. beds of the ceramic corrugated material placed into a single tube reactor, the second bed being spaced downflow from the first and means being provided for the injection of oxygen into the gas stream flowing into the second bed. The reaction temperature in both beds was about 800° F., and no oxygen was added to the second bed. The exit gases showed zero NO and zero $NH_3$ and one percent propane.

EXAMPLE 38

Example 37 was repeated except air was admitted between the beds and the temperature in the second bed due to the reaction exothermicity increased to about 1050° F. The gases issuing from the second bed were found to contain only $N_2$, $H_2O$ and $CO_2$. Propane, CO, NO, $NO_2$ and $NH_3$ were not found.

To show that it is critical to employ less than about 0.5 troy ounce of ruthenium per 1000 cubic feet of gas being treated per hour, the following series of runs was made. A synthetic gaseous mixture approximating the exhaust composition from a single-cylinder internal combustion engine operated at constant load was separately contacted with catalyst beds consisting of one percent ruthenium and two percent ruthenium on gamma alumina having a surface area of 200 square meters per gram at various space velocities and a temperature of 900° F. The gaseous mixture being treated had the following composition: 1400 parts per million by volume of NO, 0.15 percent $C_2$ to $C_6$ saturated and unsaturated hydrocarbons (as percent by weight of carbon), and, in percent by volume, three percent carbon monoxide, one percent hydrogen, 13.0 percent water and 11.0 percent carbon dioxide. The results obtained using the catalyst carrying one percent by weight of ruthenium are summarized below in Table VI and with the catalyst containing two percent ruthenium in Table VII.

TABLE VI

| Ex. No. | GHSV | Volume percent of NO converted | Weight percent of NO converted to $NH_3$ | Volume percent of— | | Troy ounce of ruthenium per 1,000 cubic feet of gas per hour treated |
|---|---|---|---|---|---|---|
| | | | | CO converted | Hydrocarbons converted | |
| 39 | 3,000 | 100 | 30 | 40 | 65 | 1.51 |
| 40 | 6,000 | 100 | 17 | 35 | 40 | 0.76 |
| 41 | 10,000 | 100 | 6 | 13 | 14 | 0.45 |
| 42 | 12,000 | 100 | 2 | 8 | 2 | 0.38 |
| 43 | 15,000 | 100 | 0.3 | 5 | 0.5 | 0.30 |
| 44 | 20,000 | 100 | 0.1 | 1 | 0 | 0.22 |
| 45 | 40,000 | 100 | 0 | 0.5 | 0 | 0.11 |
| 46 | 60,000 | 100 | 0 | 0.1 | 0 | 0.07 |
| 47 | 80,000 | 99 | 0 | 0.1 | 0 | 0.05 |

TABLE VII

| Ex. No. | GHSV | Volume percent of NO converted | Weight percent of NO converted to $NH_3$ | Volume percent of— | | Troy ounce of ruthenium per 1,000 cubic feet of gas per hour treated |
|---|---|---|---|---|---|---|
| | | | | CO converted | Hydrocarbons converted | |
| 48 | 3,000 | 100 | 35 | 53 | 80 | 3.03 |
| 49 | 6,000 | 100 | 22 | 31 | 54 | 1.51 |
| 50 | 10,000 | 100 | 9 | 18 | 23 | 0.91 |
| 51 | 12,000 | 100 | 5 | 11 | 13 | 0.45 |
| 52 | 15,000 | 100 | 2 | 5 | 1 | 0.38 |
| 53 | 20,000 | 100 | 1 | 1 | 0.5 | 0.30 |
| 54 | 40,000 | 100 | 0.3 | 0.5 | 0.3 | 0.22 |
| 55 | 60,000 | 100 | 0 | 0.1 | 0.1 | 0.11 |
| 56 | 80,000 | 99 | 0 | 0.1 | 0 | 0.07 |

An additional series of runs was carried out, as in Tables VI and VII, but the GHSV was maintained constant at 8000 and catalyst concentrations of 0.5, one and two percent by weight of ruthenium were used. The data are summarized below in Table VIII.

TABLE VIII

| Ex. No. | Concentration of ruthenium | Volume percent conversion of— | | | Weight percent conversion of NO to NH₃ | Troy ounce of ruthenium per 1,000 cubic feet of gas per hour treated |
|---|---|---|---|---|---|---|
| | | NO | CO | HC | | |
| 57 | 0.5 | 100 | 7 | 10 | 3 | 0.28 |
| 58 | 1.0 | 100 | 18 | 25 | 10 | 0.56 |
| 59 | 2.0 | 100 | 22 | 37 | 17 | 1.13 |

The above clearly shows that in order to convert substantially all of the NO in a gaseous mixture, without the formation of appreciable amounts of ammonia, it is critcial to treat the gaseous mixture with less than about 0.5 troy ounce of ruthenium per 1000 cubic feet of gas being treated. Note, too, that when operating in accordance with the preferred procedure defined herein little conversion of CO or hydrocarbon occurs, even at reaction temperatures as high as 900° F. However, when more than 0.5 troy ounce of ruthenium is used per 1000 cubic feet of gaseous mixture being treated per hour, the conversion of CO and hydrocarbons, resulting from the water gas shift reaction, is substantial. It is our belief that the conversion of the nitrogen oxides occurs as a result of their reaction with hydrogen and with CO in the gaseous mixture. Of course, since small amounts of nitrogen oxides are in the gaseous mixture being treated, only small amounts of hydrogen and CO are needed to react therewith. When the gaseous mixture being treated contains water in addition to CO, as in the exhaust gas of an internal combustion engine, the water gas shift reaction can occur in the presence of ruthenium at elevated temperatures, resulting in the formation of $CO_2$ and hydrogen and partial elimination of CO initially present. We believe, however, by operating in accordance with our invention that the water gas shift reaction does not occur to any appreciable extent and, therefore, little additional hydrogen is produced. Thus, since the amount of hydrogen in the mixture is not appreciably increased, we believe the reduction of NO to nitrogen occurs rather than to $NH_3$. This is further substantiated by the results contained in Tables VI and VII. In Table VI, if Experiments Nos. 39 and 42 are compared, it can be seen that the conversion of CO and hydrocarbons by the water gas shift reaction is much greater in Experiment No. 39 than in Experiment No. 42. Thus, the amount of hydrogen present in the reducing gases in Experiment No. 39 will be much greater than that present in Experiment No. 42. This large amount of hydrogen resulting from the water gas shift reaction causes the amount of ammonia formed in Experiment No. 39 to be much greater than that in Experiment No. 42. A very similar conclusion is reached by comparing Experiment Nos. 48 and 52 in Table VII.

The procedure defined and claimed herein is in substantial contrast to that of U.S. Pat. No. 3,370,914 to Gross et al. wherein a gaseous mixture from an internal combustion engine is treated with selected catalysts, including ruthenium, but in such a manner as to promote the essentially complete conversion of CO and hydrocarbons to $CO_2$ and hydrogen by the water gas shift reaction, with the simultaneous conversion of nitrogen oxides. As shown above, this can be done but at the expense of converting unacceptably large amounts of the nitrogen oxides to ammonia. By contacting the exhaust mixture with a critical amount of ruthenium as taught herein, little conversion of CO and hydrocarbons occur as a result of the water gas shift reaction and substantially all of the nitrogen oxides are converted to nitrogen rather than to ammonia.

If, however, an attempt were made, as in the Gross et al. patent referred to above, to use ruthenium as catalyst to convert all of the nitrogen oxides, hydrocarbons and CO in a gaseous exhaust mixture, and assuming that ammonia resulting from the conversion of the nitrogen oxides would be acceptable, the catalyst volume would be impractical and the absolute amount of ruthenium needed would render the process uneconomically attractive in an automotive vehicle. This is shown from Table IX below, which is based upon an interpolation of the data summarized above in Tables VI and VII. The interpolation is based on the initial assumption that a constant amount of gas is being treated such that when four liters of catalyst are used, a gas hourly space velocity of 33,972 is achieved. As shown in Table IX, as the space velocity is decreased, the catalyst volume is thereby correspondingly increased under constant gas flow.

TABLE IX

| Catalyst volume | | Gas hourly space velocity | Troy ounce of ruthenium per 1,000 cubic feet of gas treated per hour when using catalyst concentrations of— | | | Weight of ruthenium in grams when using catalyst containing— | | |
|---|---|---|---|---|---|---|---|---|
| Liters | Cubic inches | | Two percent ruthenium | One percent ruthenium | 0.5 percent ruthenium | Two percent ruthenium | One percent ruthenium | 0.5 percent ruthenium |
| 4 | 244 | 33,972 | 0.26 | 0.13 | 0.06 | 40 | 20 | 10 |
| 13.58 | 828 | 10,000 | 0.91 | 0.45 | 0.22 | 135.8 | 67.9 | 33.9 |
| 15.09 | 920 | 9,000 | 1.01 | 0.505 | 0.25 | 150.0 | 75.4 | 37.7 |
| 27.17 | 1,656 | 5,000 | 1.82 | 0.91 | 0.45 | 271.7 | 135.8 | 67.9 |
| 135.88 | 8,820 | 1,000 | 9.10 | 4.55 | 2.27 | 1,358.8 | 679.4 | 339.7 |

It can be seen from Table IX that by operating in accordance with the procedure herein, we can effectively employ a catalyst carrying 0.5 percent by weight of ruthenium that is, a total of 10 grams of ruthenium) with a catalyst volume of about four liters (244 cubic inches), whereas the smallest amount of catalyst volume needed to convert substantial amounts of NO, CO and hydrocarbons would be in excess of 27.17 liters. Of course, to obtain substantially complete conversions of each item, catalyst volumes and absolute amounts of ruthenium far in excess of the latter would be required.

Unexpectedly, we have also found that the use of the ruthenium catalyst, as defined herein, permits us to convert substantially all of the nitrogen oxides in the exhaust gases to nitrogen with no appreciable formation of ammonia, even when such exhaust gases contain relatively large amounts of oxygen. This is shown below in Example 60.

EXAMPLE 60

A gaseous mixture containing 0.5 volume percent NO, two volume percent CO, eight volume percent $H_2O$, one volume percent $H_2$ and eight volume percent $CO_2$ was passed at a temperature of 850° F. and atmospheric pressure over a catalyst containing 0.5 weight percent ruthenium on alumina at a GHSV of 20,000. Volume percent of oxygen in the feed was varied throughout the run as indicated in Table X. Under these conditions the amount of ruthenium used was 0.11. Troy ounce per 1000 cubic feet of gas per hour. The results are tabulated below in Table X.

TABLE X

| Volume percent $O_2$ | Percent conversion of NO | Stoichiometric ratio [1] of— |
|---|---|---|
| 0 | 100 | 0 |
| 0.5 | 100 | 0.33:1 |
| 1.0 | 100 | 0.66:1 |
| 1.25 | 100 | 0.83:1 |
| 1.30 | 98 | 0.86:1 |
| 1.50 | 43 | 1.00:1 |
| 2.00 | 10 | 1.33:1 |

[1] Molecular oxygen to reducing agents ($CO+H_2$).

In each of the above runs substantially complete conversion of NO to nitrogen resulted, provided the stoichiometric ratio of molecular oxygen to reducing agents was less than 1:1. In all cases, however, the nitrogen oxides were converted to nitrogen. These results are highly desirable, especially in the treatment of an exhaust gas from an internal combustion engine, since such gases will normally contain small quantities of free oxygen. Even though the amount of free oxygen in the exhaust gases will generally be below about one percent by volume, during normal operation of an engine the amount of free oxygen therein can be as high as about two percent by volume, or even higher.

The above results are completely unexpected. For example, French patent publication No. 2,037,019 (registration No. 69.35926, made open to the public in B.O.P.I. "Listes" No. 48 of Dec. 31, 1970) states that if ruthenium is used to treat an exhaust gas containing in excess of 0.5 volume percent of oxygen unacceptably low conversions of nitrogen oxides are obtained. Thus, when the French patentee treated an exhaust gas containing 1500 p.p.m. of NO with a catalyst containing 0.02 weight percent ruthenium and 99.98 weight percent $Al_2O_3$ at a space velocity of 100,000 (that is, using approximately 0.0009 troy ounce of ruthenium per 1000 cubic feet of gas per hour) he obtained only 56 percent conversion of NO. In direct contrast to the teaching of the French patent, by operating in accordance with our procedure and using the critical amounts of ruthenium defined herein, substantially complete conversion of NO is obtained without appreciable formation of ammonia, even when the volume percent of oxygen present is substantially in excess of 0.5 volume percent.

We have further discovered that by using ruthenium within the critical ranges defined herein the concentration of oxygen in the gaseous mixture being treated has, in fact, no adverse affect on the desired conversion of all of the nitrogen oxides to nitrogen and that oxygen concentrations in excess of even those used in this Example 60 can be tolerated, provided the stoichiometric ratio of molecular oxygen to reducing agents, which ratio defines the reducing atmosphere herein, is maintained below 1:1. In fact, we have found, unexpectedly, that the desired conversion of nitrogen oxides to nitrogen is obtained as long as a reducing atmosphere is maintained, even when the stoichiometric ratio of molecular oxygen to reducing agents approaches 1:1.

This is illustrated by again referring to Table X. Note that as the volume percent of oxygen is increased to 1.30 volume percent substantially complete conversion of NO is obtained. Treatment of the gaseous mixture containing 1.30 volume percent of oxygen with ruthenium was obviously effected in a reducing atmosphere, since the stoichiometric ratio of molecular oxygen to reducing agents was 0.86:1. When the volume percent of oxygen in the mixture was increased to 1.50 percent, however, a reducing atmosphere was not present and unacceptably low conversion of NO resulted. In fact, it was surprising that even 43 percent conversion of NO was obtained. When the volume percent of oxygen in the reaction mixture was further increased to 2.00 volume percent, instead of a reducing atmosphere an oxidizing atmosphere was present and only 10 percent of NO was converted. It is apparent, therefore, from the above data that the concentration of oxygen is not the critical factor in the operation defined herein so long as a reducing atmosphere is maintained during the operation.

This too, is surprising in view of the French patent. Not only does the French patentee advise one not to treat an exhaust gas with ruthenium when such exhaust gas contains a significant amount of molecular oxygen, but calculations based on the data to be found therein would indicate, additionally, that a more highly reducing atmosphere would be required for successful treatment of such gases than discovered herein. This is illustrated below in Table XI, which is based on the data in the French patent using ruthenium alone.

TABLE XI

| Volume percent $O_2$ | Percent conversion of NO | Stoichiometric ratio [1] of— |
|---|---|---|
| 0 | 95 | 0 |
| 0.5 | 100 | 0.25:1 |
| 0.8 | 56 | 0.80:1 |

[1] Molecular oxygen to reducing agents ($CO+H_2$).

From Table XI one would be led to believe that a highly reducing atmosphere would be needed to successfully convert all of the nitrogen oxides with ruthenium, since a stoichiometric ratio of oxygen to reducing agents in the reaction mixture appreciably below 0.80:1 would be required. Again, referring to Table X it can be seen that using the critical amounts of ruthenium in accordance with the procedure defined herein excellent results are obtained even when the stoichiometric ratio of molecular oxygen to reducing agents is as high as 0.86:1.

Although we have shown in the specific examples herein that effective results are obtained with a catalyst consisting essentially of ruthenium, it is within the scope of our invention to use not only ruthenium alone but also in combination with other materials, for example promoters, such as potassium, sodium, calcium, barium, magnesium, lithium, rubidium, cesium, strontium and thallium; metals, such as platinum, palladium, rhodium, cobalt, nickel, iron, manganese, rhenium, chromium, molybdenum, tellurium, tungsten, vanadium, niobium, antimony, tantalum, bismuth, titanium, zirconium, zinc, cadmium, copper and uranium, etc., provided the amount of ruthenium is within the critical limits defined herein.

Resort may be had to such variations and modifications as fall within the spirit of the invention and the scope of the appended claims.

We claim:

1. A process for the reduction of substantially all of the nitrogen oxides in exhaust gases from internal combustion engines to selectively form nitrogen as substantially the only nitrogen-containing compound which comprises contacting said exhaust gas at an elevated temperature of at least about 400° F. in a reducing atmosphere with a catalyst consisting of about 0.01 to about two weight percent of ruthenium distended on a support, which support has a surface area of about 10 m.² to about 500 m.² per gram, provided said amount of ruthenium is from about 0.003 to about 0.5 troy ounce per 1000 cubic feet of exhaust gas being contacted per hour.

2. The process of claim 1 wherein the amount of said ruthenium contacting said exhaust gas is in the range of about 0.008 to about 0.3 troy ounce.

3. The process of claim 1 wherein the amount of said ruthenium contacting said exhaust gas is in the range of about 0.01 to about 0.2 troy ounce.

4. The process of claim 1 wherein said elevated temperature is in the range of about 400° to about 1500° F.

5. The process of claim 1 wherein said elevated temperature is in the range of about 800° to about 1400° F.

6. The process of claim 1 wherein the ruthenium is on a support selected from the group consisting of alumina, silica, magnesia, thoria, titania, zirconia or mixtures thereof.

7. The process of claim 6 wherein said support is mounted on a ceramic base.

8. The process of claim 1 wherein ruthenium is on a support and the exhaust gas is passed through the reaction zone at a gas hourly space velocity of about 10,000 to about 200,000.

9. The process of claim 1 wherein ruthenium is on a support and the exhaust gas is passed through the reaction zone at a gas hourly space velocity of about 10,000 to about 90,000.

10. The process of claim 1 wherein ruthenium is on a support in an amount of about 0.05 to about two weight percent.

11. The process of claim 1 wherein the exhaust being treated contains the following components:

| Components | Range |
| --- | --- |
| (1) $No_x$ where $x$ is 1 or 2 p.p.m. by vol | 50 to 5,000 |
| (2) Free molecular oxygen mol percent | 0 to 5 |
| (3) Free molecular hydrogen do | 0.1 to 4 |
| (4) CO do | 0.2 to 8 |
| (5) Hydrocarbons p.p.m. by vol | 0 to 4,000 |
| (6) $H_2O$ mol percent | 5 to 16 |
| (7) $CO_2$ do | 5 to 16 |
| (8) Lead (as metal) p.p.m. by vol | 0 to 12 |
| (9) Nitrogen mol percent | 53 to 89 |

12. The process of claim 1 wherein the exhaust being treated contains the following components:

| Components | Range |
| --- | --- |
| (1) $NO_x$ where $x$ is 1 or 2 p.p.m. by vol | 100 to 3,500 |
| (2) Free molecular oxygen mol percent | 0.5 to 2 |
| (3) Free molecular hydrogen do | 0.2 to 1 |
| (4) CO do | 0.4 to 2 |
| (5) Hydrocarbons p.p.m. by vol | 50 to 1,000 |
| (6) $H_2O$ mol percent | 10 to 13 |
| (7) $CO_2$ do | 10 to 13 |
| (8) Lead (as metal) p.p.m. by vol | 0 to 4 |
| (9) Nitrogen mol percent | 68 to 78 |

13. The process of claim 1 wherein the treated gases are further reacted in a second stage oxidation reactor in the presence of an added gas containing free molecular oxygen to oxidize any hydrocarbons or carbon monoxide therein to a product comprising $CO_2$ and water.

14. The process of claim 13 wherein said oxidation is carried out in the presence of a Group VIII metal.

15. The process of claim 13 wherein said oxidation is carried out in the presence of ruthenium.

16. The process of claim 1 wherein said exhaust gas contains $NO_x$, wherein $x$ is 1 or 2, free molecular oxygen, free molecular hydrogen, CO, unburned hydrocarbons, water, $CO_2$ and nitrogen, wherein the stoichiometric ratio of molecular oxygen to said hydrogen and CO is less than about 1:1.

17. The process of claim 16 wherein the stoichiometric ratio of molecular oxygen to said hydrogen and CO is less than about 0.9:1.

18. The process of claim 1 wherein said exhaust gas contains from 0.5 to 2 mol percent of free molecular oxygen.

19. The process of claim 1 wherein the product gas resulting from said reaction contains ammonia equivalent to no more than about seven weight percent of the nitrogen oxides present in said exhaust gas.

References Cited

UNITED STATES PATENTS

| | | | |
| --- | --- | --- | --- |
| 2,747,976 | 5/1956 | Houdry | 423—213 X |
| 3,230,034 | 1/1966 | Stiles | 423—213 |
| 3,370,914 | 2/1968 | Gross et al. | 423—213 |
| 3,637,344 | 1/1971 | Thompson | 423—214 |
| 2,601,221 | 6/1952 | Rosenblatt | 423—351 X |

OTHER REFERENCES

Mellor: Comprehensive Treatise on Inorganic and Theoretical Chemistry, vol. VIII, Longmans, Green & Co., London, 1928, pp. 394–397 and 428–9.

GEORGE O. PETERS, Primary Examiner

U.S. Cl. X.R.

60—301; 423—213.7

UNITED STATES PATENT OFFICE
CERTIFICATE OF CORRECTION

Patent No. 3,784,675     Dated January 8, 1974

Inventor(s) Tadeusz P. Kobylinski and Brian W. Taylor

It is certified that error appears in the above-identified patent and that said Letters Patent are hereby corrected as shown below:

Column 2, line 60, "is" should be "in".

Column 8, line 73, "formulation" should be "formation".

Column 9, Table V, last line of 7th column heading, "NO to $NH_3^1$" should read "NO to $NH_3^3$".

Signed and sealed this 16th day of July 1974.

(SEAL)
Attest:

McCOY M. GIBSON, JR.
Attesting Officer

C. MARSHALL DANN
Commissioner of Patents